United States Patent
Walewski (10) Patent No.: US 8,811,825 B2
(45) Date of Patent: Aug. 19, 2014

(54) METHOD AND ARRANGEMENT FOR STABILIZING A COLOR CODING METHOD AND OPTICALLY TRANSFERRING DATA

(75) Inventor: Joachim Walewski, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 70 days.

(21) Appl. No.: 13/510,383

(22) PCT Filed: Nov. 5, 2010

(86) PCT No.: PCT/EP2010/066907
§ 371 (c)(1),
(2), (4) Date: May 17, 2012

(87) PCT Pub. No.: WO2011/061073
PCT Pub. Date: May 26, 2011

(65) Prior Publication Data
US 2012/0224864 A1    Sep. 6, 2012

(30) Foreign Application Priority Data

Nov. 18, 2009  (DE) .......................... 10 2009 053 820
Feb. 8, 2010   (DE) .......................... 10 2010 007 273

(51) Int. Cl.
*H04B 10/00*   (2013.01)

(52) U.S. Cl.
USPC ........... 398/162; 398/158; 398/172; 398/140; 398/195

(58) Field of Classification Search
USPC .......... 398/158, 172, 183, 186, 162, 140, 195
See application file for complete search history.

(56) References Cited

U.S. PATENT DOCUMENTS

| | | | | |
|---|---|---|---|---|
| 5,822,099 A | * | 10/1998 | Takamatsu | 398/162 |
| 7,359,634 B1 | * | 4/2008 | Meli | 398/28 |
| 7,646,990 B2 | * | 1/2010 | Weber et al. | 398/197 |

(Continued)

FOREIGN PATENT DOCUMENTS

| | | | | |
|---|---|---|---|---|
| DE | 102007043255 A1 | 3/2009 | ............. | H04B 10/10 |
| WO | 2004/068745 A1 | 8/2004 | ............. | H04B 10/10 |
| WO | 2009/010916 A2 | 1/2009 | ............. | H05B 37/02 |
| WO | WO2009/010916 A2 | * 1/2009 | ............. | H05B 37/02 |

OTHER PUBLICATIONS

Color Multiplex Coding for VLC by Atsuya Yokoi Samsung Yokohama Research Institute. IEEE @Nov. 13, 2008.*

(Continued)

*Primary Examiner* — Daniel Washburn
*Assistant Examiner* — Hibret Woldekidan
(74) *Attorney, Agent, or Firm* — King & Spalding L.L.P.

(57) ABSTRACT

A method is provide for optically transferring data between a transmitter and a receiver employs a color coding method based on a plurality of elementary colors for encoding and transferring the data. Each elementary color is transmitted by one optical radiation source each on the transmitter side, and is received on the receiver side by one optical radiation receiver each. A control loop is formed between the transmitter and the receiver, wherein calibration messages are sent by the transmitter to the receiver, and wherein compensation information is determined by means of comparing at least one channel property of at least one received calibration message to a corresponding channel property of at least one previously transmitted calibration message, and wherein an adjustment of at least one transmitting parameter is made in the transmitter on the basis of the compensation information.

18 Claims, 4 Drawing Sheets

(56) References Cited

U.S. PATENT DOCUMENTS

| | | | |
|---|---|---|---|
| 8,253,353 B2* | 8/2012 | Baggen et al. | 315/308 |
| 2002/0167701 A1* | 11/2002 | Hirata | 359/172 |
| 2002/0167707 A1 | 11/2002 | Oomori et al. | 398/202 |
| 2008/0252664 A1* | 10/2008 | Huang et al. | 345/690 |
| 2010/0135670 A1* | 6/2010 | Amadeo et al. | 398/158 |
| 2010/0177678 A1* | 7/2010 | Sayegh | 370/315 |
| 2010/0245634 A1* | 9/2010 | Ahdoot | 348/250 |
| 2010/0254714 A1 | 10/2010 | Gaete Jamett et al. | 398/183 |
| 2012/0308229 A1* | 12/2012 | Bahr et al. | 398/25 |
| 2013/0064541 A1* | 3/2013 | Walewski | 398/25 |
| 2013/0308955 A1* | 11/2013 | Walewski | 398/118 |

OTHER PUBLICATIONS

Pang, G., et al., "Optical Wireless Based on High Brightness Visible LEDs", Industry Applications Conference, 34$^{th}$ Annual IAS Annual Meeting, Conference Record of the 1999 IEEE, vol. 3, pp. 1693-1699, Oct. 3, 1999.

Kang, T.G., et al., IEEE 802.15.7 VLC PHY/MAC Specification Proposal, IEEE 802.15 Working Group for Wireless Personal Area Networks, Book; 37 pages, Oct. 2009.

Yokoi, A. et al, "IEEE P802.15, Wireless Personal Area Networks", 10 pages, Jan. 2010.

International PCT Search Report and Written Opinion, PCT/EP2010/066907, 13 pages, Feb. 18, 2011.

Japanese Grant Decision, Application No. 1020127015568, 3 pages, Dec. 10, 2013.

* cited by examiner

METHOD AND ARRANGEMENT FOR STABILIZING A COLOR CODING METHOD AND OPTICALLY TRANSFERRING DATA

CROSS-REFERENCE TO RELATED APPLICATIONS

This application is a U.S. National Stage Application of International Application No. PCT/EP2010/066907 filed Nov. 5, 2010, which designates the United States of America, and claims priority to DE Patent Application No. 10 2009 053 820.8 filed Nov. 18, 2009 and DE Patent Application No. 10 2010 007 273.7 Filed Feb. 8, 2010. The contents of which are hereby incorporated by reference in their entirety.

TECHNICAL FIELD

The disclosure relates to a method and an arrangement for stabilizing a color coding method and optically transferring data.

BACKGROUND

Data transmission by means of visible light ("visible-light communications", VLC) is known, which can be used, for example, to supplement conventional radio engineering. In this case, data can be transmitted via light-emitting diodes (LEDs), for example. In this case, a data stream to be transmitted is transmitted in the form of modulations imperceptible to humans.

Also known is a more recent encoding method for visible light based on color coding with elementary colors. Experts also refer to this kind of method using the term CSK ("color shift keying"). Other older names for this encoding method are CCM ("color code modulation") or CMC ("color multiplex coding").

Roughly speaking, the functional principle of VLC using this color coding method consists in using mixed lighting comprising a plurality of elementary colors for the additional transfer of data, wherein the respective elementary colors are modulated so quickly that in total the human eye recognizes a continuous mixed color. Usually, the three elementary colors red, green and blue are used for this, which can be emitted by sophisticated technology by means of corresponding light-emitting diodes.

A detailed description of CSK can be found in the proposed modification to the standard IEEE P802.15.7, Yokoi et al.: "Modified Text clause 6.9.2.2", 17 Jan. 2010, Document Identification "15-10-0036-00-0007". One of the proposed applications for CSK applications is VLC, that is free-space communication with light.

Said proposed modification describes automatic compensation on the receiver side for the changes to the optical power of the elementary color light-emitting diodes provided on the transmitter side. Changes of this kind occur, for example, due to ageing phenomena in individual light-emitting diodes, which, with an increasing service life with the same electrical power supply, are only able to emit a lower optical power. A change of this kind is accompanied by a proportional change in the quantum efficiency of the transmitters. According to this proposed modification, as the compensation is only on the receiver side, obviously there is no compensation of the mixed color, that is of the spectrum of the emitted radiation. Therefore, there is a requirement to compensate changes to the optical power of the elementary color light-emitting diodes provided on the transmitter side not on the receiver side, for example by adjusted sensitivity of radiation receivers, but on the transmitter side, for example by a higher supply of electrical energy with reduced quantum efficiency.

SUMMARY

In one embodiment, a method for optically transferring data between a transmitter and a receiver is provided, wherein a color coding method based on a plurality of elementary colors is provided for encoding and transferring the data, wherein each elementary color is transmitted by at least one respective optical radiation source on the transmitter side and received on the receiver side by at least one respective optical radiation receiver, wherein a control loop is formed between the transmitter and the receiver, wherein the transmitter transmits calibration messages to the receiver and, wherein at least one piece of compensation information is determined by means of comparing at least one channel property of at least one received calibration message with a corresponding channel property of at least one previously transmitted or stored calibration message, wherein an adjustment of at least one transmitting parameter is made in the transmitter on the basis of the compensation information.

In a further embodiment, the comparison of at least one channel property is performed in the receiver, by means of comparing at least one channel property of at least one received calibration message with a corresponding channel property of at least one previously transmitted calibration message, at least one compensation factor is determined in the receiver and, based on the compensation factor determined, compensation information is transmitted from the receiver to the transmitter. In a further embodiment, a compensation factor is determined for each elementary color. In a further embodiment, a transformer(TR) is [provided] on the transmitter side for converting two-dimensional digital intensity data into an intensity data vector with a dimension corresponding to the plurality of elementary colors. In a further embodiment, three elementary colors are used. In a further embodiment, at least one compensation factor is determined by means of comparing a channel property matrix of at least one received calibration message with a corresponding reference channel property matrix of at least one previously transmitted or stored calibration message. In a further embodiment, the compensation factor is a number vector.

In a further embodiment, the compensation factor is a number vector comprising the diagonal elements of a matrix, which is obtained by multiplying the inverted channel property matrix with the reference channel property matrix. In a further embodiment, based on the compensation factor determined, compensation information is only transmitted from the receiver to the transmitter when at least one vectorial element of the compensation factor adopts a value, which substantially adopts a value unequal to one. In a further embodiment, at least one vectorial element of the compensation factor adopts a value unequal to one when the value of the vectorial element exceeds and/or falls below a presettable confidence interval by a value of one.

In a further embodiment, at least one secondary diagonal element of a matrix, which is obtained by multiplying the inverted channel property matrix with the reference channel property matrix, is checked to determine whether the at least one secondary diagonal element deviates substantially from a value of zero. In a further embodiment, in the case of a substantial deviation of at least one secondary diagonal element of the matrix, an error message is transmitted.

In a further embodiment, the calibration message comprises orthogonal calibration symbols. In a further embodiment, the calibration message comprises Walsh-encoded calibration symbols. In a further embodiment, to determine the channel property matrix with respect to the D.C. behavior, a plurality of time slots of calibration message each contains an identical calibration symbol.

In another embodiment, an optical transmission system for optically transferring data between a transmitter and a receiver set up to encode and transfer the data using a color coding method based on a plurality of elementary colors with a respective optical radiation source on the transmitter for transmitting a respective elementary color and a respective optical radiation receiver on the receiver side includes: a control loop embodied between the transmitter and the receiver for transmitting calibration messages from the transmitter to the receiver, a compensation unit (CU) provided in the receiver for determining at least one compensation factor by means of comparing at least one channel property of a least one received calibration message with a corresponding channel property of at least one previously received calibration message, a back channel (BC) for transferring compensation information based on the determined compensation factor from the receiver to the transmitter, and a correction element provided in the transmitter correction element for the adjustment of at least one transmitting parameter on the basis of the compensation information.

In another embodiment, an optical transmission system is provided for carrying out any of the methods disclosed herein.

BRIEF DESCRIPTION OF THE DRAWINGS

Example embodiments will be explained in more detail below with reference to figures, in which.

DETAILED DESCRIPTION

Some embodiments provide means for transmitter-side compensation of the spectrum of the emitted optical radiation.

The present disclosure is based on a method which is known per se for optically transferring data between a transmitter and a receiver, wherein a color coding method based on a plurality of elementary colors is provided for encoding and transferring the data, wherein in addition each elementary color is transmitted by a respective optical radiation source on the transmitter side and received on the receiver side by a respective optical radiation receiver.

According to some embodiments, a control loop is formed between the transmitter and the receiver, wherein calibration messages are sent by the transmitter to the receiver and compared in the receiver or, alternatively, in the transmitter, with at least one previously transmitted and/or stored calibration message using a channel property of the two compared calibration messages to determine compensation information. An adjustment of at least one transmitting parameter is made in the transmitter on the basis of the compensation information determined. The calibration message can in this case have been transmitted previously or be already stored in a corresponding factory setting.

In this context, the terms "transmitter" and "receiver" should be understood as meaning that, in addition to its ability to both send and receive data in a duplex mode, the "transmitter" simultaneously functions as a light source, while, although the "receiver" is able to send and receive data in a duplex mode, it is not necessarily as operated as a light source. In this case, the operation of the transmitter as a light source includes, for example, an embodiment as interior lighting or also as a display panel.

In an advantageous manner, some embodiments enable transmitter-side compensation of the mixed color of the emitted optical radiation, which has changed, for example, due to an intensity drift of a single elementary color.

Hence, a significant advantage of certain embodiments can be considered to be the fact that the use of the means disclosed herein may permit stable color coding, wherein the color drift is compensated on the transmitter side. A further advantage is that the color originally set does not change over the course of time.

Transmitter-side compensation of the color drift is in particular advantageous compared to receiver-side compensation in that this only has to take place in one system—that is, for example, in the interior lighting system used simultaneously for the data transmission—and not in a plurality of receivers—for example portable computers communicating with the interior lighting system.

In an advantageous manner, in addition to the exchange of data, the transmitter may be used for interior lighting in that the additively mixed elementary colors produce a temporally constant mixed color for the human eye. However, it is stressed that parallel use of the transmitter interior lighting is not essential in at least some embodiments.

Conversely, embodiments of the method according may be for optically transferring data has the exclusive purpose of setting the spectral data of the interior lighting by means of the exchange of calibration messages and/or compensation information. In an alternative embodiment of this kind, the interior lighting should be regulated in such a way that a desired color or color drift of the interior lighting is compensated without the transfer of data having any purpose beyond the compensation of said color drift.

One embodiment envisages the formation of a control loop between the transmitter and the receiver, wherein calibration messages are sent by the transmitter to the receiver and compensation factors are determined by means of a comparison in the receiver with at least one previously transmitted and/or stored calibration message with reference to a channel property of the two compared calibration messages. On the basis of the determined compensation factor, compensation information is sent from the receiver to the transmitter with reference to which the transmitter is able to adjust at least one transmitting parameter.

In a further embodiment, a color drift of the transmitter is compensated in that a compensation matrix $H_i$ is compared with an original compensation matrix $H_0$ and compensation factors c are transferred back to the transmitter. Alternatively, the determination of at least one compensation factor c is performed in the transmitter on the basis of the compensation information.

Embodiments

Figure 1:
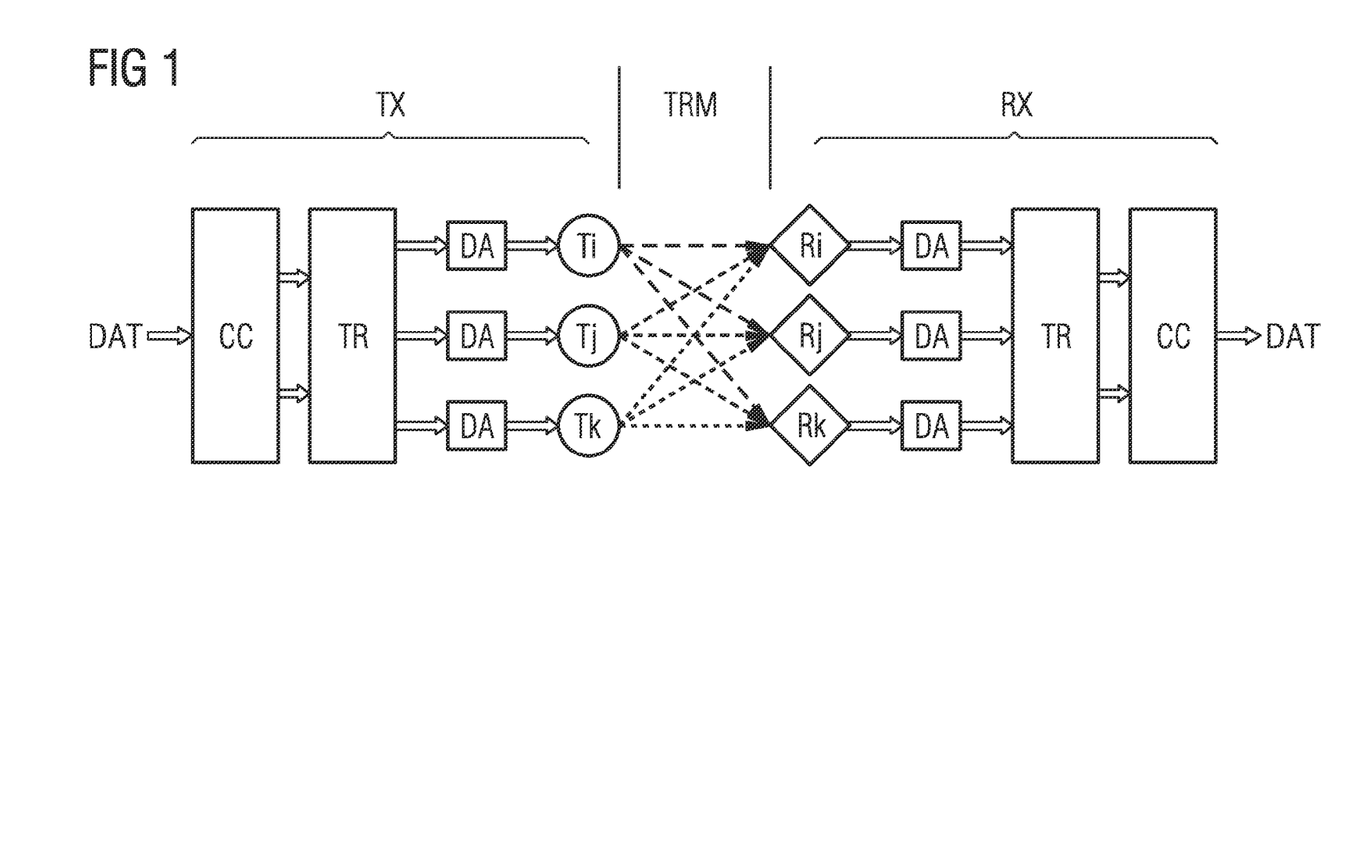
FIG. 1 shows a structure diagram for the schematic representation of an optical transferring system.

FIG. 1 shows an optical data transmission system for visible light based on CSK ("color shift keying"), for example a VLC system ("visible-light communication").

The data transmission system substantially comprises a transmitter TX, a transmission link TRM and a receiver RX. The transmission system works in a duplex mode wherein the transmitter TX is able both to send and receive data. The same applies to the receiver RX.

The CSK method is based on color coding with a plurality of elementary colors, for example red, green and blue. A detailed description of CSK may be found in the proposed modification to Standard IEEE P802.15.7, Yokoi et al.: "Modified Text clause 6.9.2.2", 17 Jan. 2010, Document Identification "15-10-0036-00-0007".

For purposes of simplification, at the transmitter side, FIG. 1 only shows the functional units of the transmitter TX required for transmission and, at the receiver side, only shows the functional units of the receiver RX required for reception.

At the transmitter side TX, digital data DAT are first sent to a color coder CC. In the color coder, the data DAT are converted into XY values according to a mapping rule. These XY values correspond to values in an XY color coordinate system according to FIG. 3, which is described below.

At the output of the color coder CC, these two-dimensional data—indicated in the drawing by two arrows—are sent to a transformer TR at the output of which three pieces of digital intensity data are provided for an intensity of one of three elementary colors in each case.

A respective piece of digital intensity data is sent to a converter DA in which the digital intensity data are converted into analog intensity data. These analog intensity data are sent in each case to an associated optical radiation source Ti, Tj, Tk, that is to a first optical radiation source Ti, a second optical radiation source Tj and a third optical radiation source Tk.

According to a preferred exemplary embodiment, the first optical radiation source Ti corresponds to a red light-emitting diode, the second optical radiation source Tj to a green light-emitting diode and the third optical radiation source Tk to a blue light-emitting diode.

The optical radiation transmitted in this way from the respective radiation source Ti, Tj, Tk is guided via a transmission link TRM in the direction of the receiver RX.

At the receiver RX side, the transmitted optical radiation arrives at a radiation receiver Ri, Rj, Rk adjusted for a respective elementary color, namely a first optical radiation receiver Ri, a second optical radiation receiver Rj and a third optical radiation receiver Rk.

In a similar way, mirroring the transmitter TX, the respective optical signal is converted in the receiver RX by the optical radiation receiver Ri, Rj, Rk into an electrical analog signal, which is sent to a respective converter DA in which a respective conversion of the analog signal into a respective digital signal takes place.

The digital intensity data picked up at the three respective converters DA are sent to a transformer, which, mirroring the transmitter TX, converts the trio of values into a duo of values, which is in turn sent to a color decoder CD, at the output of which data DAT are finally drawn, which in a correct operating mode are identical to the data DAT sent to the transmitter TX.

FIG. 1 shows a transfer function of a CSK system. Using the general notation system, in the following A designates a matrix and a a column vector.

In an ideal synchronized CSK system with a so-called flat frequency response, the relationship between a digital signal $s_{Tx}$ to be transmitted through the optical radiation sources Ti, Tj, Tk and the digital signal $s_{Rx}$ received in the optical radiation receivers Ri, Rj, Rk can be described as follows.

$$s_{Rx} = B\ E\ T\ Q\ A\ s_{Tx} = H\ s_{Tx} \quad (1)$$

The vectorial received signal $s_{Rx}$ can, for example, comprise red, green and blue signals, wherein the index i is assigned to the red signal, the index j to the green signal and the index k to the blue signal, i.e.

$$s_{Rx} = (i_{Rx}, j_{Rx}, k_{Rx})^T, \quad (2)$$

and wherein $(\cdot)^T$ represents the transpose of the vector $(\cdot)$.

A receiver-side conversion matrix B is a diagonal matrix and describes the conversion factor between the analog and the digital receiver signal.

A sensitivity matrix E describes the sensitivity of one of the color-selective radiation receivers Ri, Rj, Rk (photoreceptors) on the reception of one of the elementary colors. Typically, but not mandatorily, exactly the same number of radiation receivers Ri, Rj, Rk as elementary colors-light-emitting diodes, that is optical radiation sources Ti, Tj, Tk, are used. With an assignment of the indices i to "red", j to "green" and k to "blue", the element $e_{ii}$ of the matrix E is, for example, the sensitivity of the red photoreceptor on the reception of the red LED emitted light. Hence, the sensitivity matrix E takes account of the spectral efficiency of a respective radiation receiver Ri, Rj, Rk responding to an elementary color and additionally of a color filter, if provided and, by a corresponding linear combination of the coefficients of the sensitivity matrix E, of "crosstalk" between the radiation receivers Ri, Rj, Rk responding to each elementary color. One example of this type of coefficient of the sensitivity matrix E is $e_{ij}$.

A transmittance matrix T describes the optical transmittance of a respective elementary color-radiation source Ti, Tj, Tk to a radiation receiver Ri, Rj, Rk provided for another elementary color in each case. In other words, the transmittance matrix T describes the propagation of the light, e.g. how much of the red light transmitted by the first optical radiation source Ti lands on the third radiation receiver Rk provided for blue light.

A quantum efficiency matrix Q is a diagonal matrix and describes the quantum efficiency of the conversion of the drive current into optical power.

A transmitter-side conversion matrix A is also a diagonal matrix and describes the relationship between the digital signal and the AC driver current supplied to the LED.

A channel property matrix H combines the channel properties of the optical transmission link as follows

H=B E T Q A

As described below, the channel property matrix H is determined by the transmission of calibration symbols. To this end, Walsh-encodings are used, for example.

If the quantum efficiency of the optical radiation sources Ti, Tj, Tk changes over time, in other words, the ratio of the respective drive current in optical power and hence, numerically, the quantum efficiency matrix Q to the changed quantum efficiency matrix Q', with the same transmit signals, the received signals change and hence according to equation (1) so does $s_{Rx}$.

Changes in the quantum efficiency Q result, for example, due to a temperature change or due to an ageing process in the transmitting light-emitting diodes. A change in the quantum efficiency means for the respective optical radiation source Ti, Tj, Tk that more or less optical power is emitted with the same current.

Transmitted calibration symbols are now used to determine a changed channel property matrix H' according to the equation $H' = B E T Q' A$.

Although this changed channel property matrix H' corrects the received signals, it does not correct the mixed color of the transmitted light resulting from the optical superposition of the individual light-emitting diodes. In other words, in conventional techniques, no changes are made to transmitting parameters, therefore hitherto compensation has been performed exclusively on the receiver side.

Figure 2:
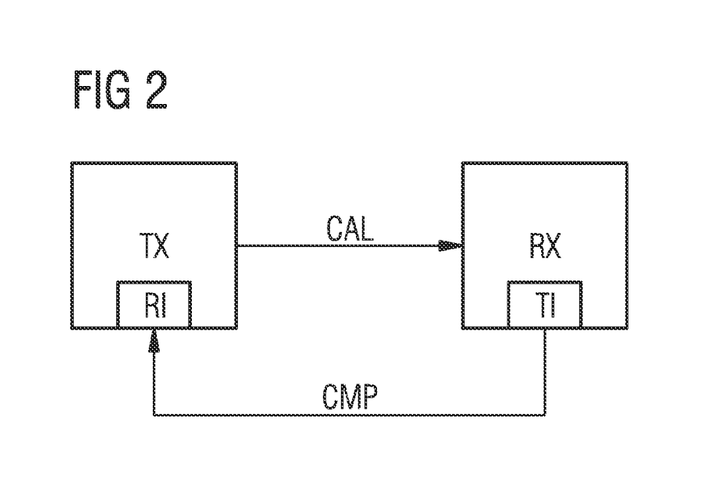
FIG. 2 shows a structure diagram for the schematic representation of a control loop according to one embodiment.
Figure 5:
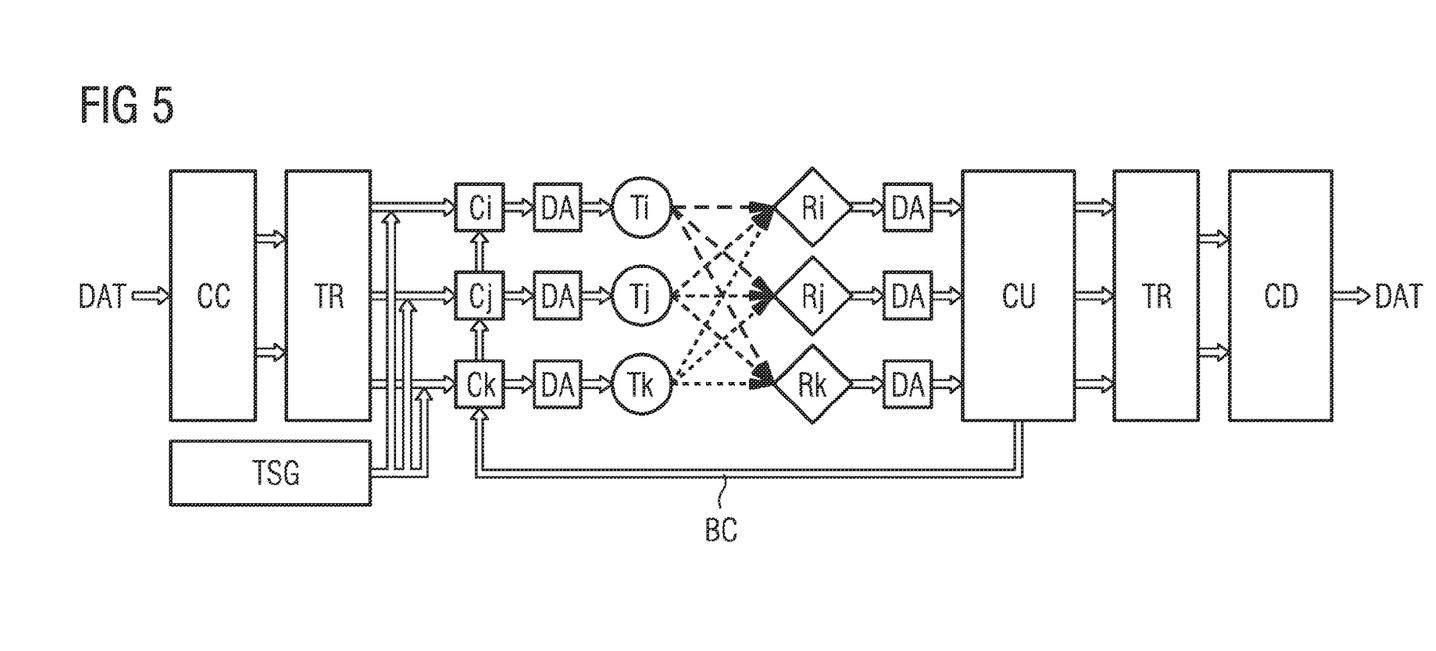
FIG. 5 shows a structure diagram for the schematic representation of an optical transfer system according to an alternative embodiment.

The following method according to FIGS. 2 and 5 is proposed for the correction of the transmitting parameters.

FIG. 2 first shows a basic diagram with a schematic representation of the control loop according to one embodiment. Here, the functional units transmitter TX and receiver RX known from FIG. 1 are shown once again.

The transmitter TX transmits at least one calibration message CAL to the receiver RX. In the receiver RX, at least one—not shown—compensation actor is calculated by means of comparing a channel property of the received calibration message CAL or previously stored values with a channel property of a previously received calibration message CAL. Channel properties are, for example, represented by the above-explained channel property matrix H'.

The compensation factor is used to create compensation information CMP, which is transmitted by the receiver RX via receiver-side transmitter interface TI to the transmitter TX. There, it is received via a transmitter-side receiver interface RI. The compensation information CMP received in the transmitter TX is then used to perform an adjustment of at least one transmitting parameter.

FIG. 5 shows inter alia the functional components of an optical data transmission system known from FIG. 1, wherein the control loop shown in FIG. 2 is implemented by a back channel BC.

Provided at the transmitter side TX, there is a calibration message generator TSG, which applies digital calibration messages to the input of a respective converter DA of a respective optical radiation source Ti, Tj, Tk. The calibration messages which are then converted and transmitted via the optical radiation sources Ti, Tj, Tk are then suitably decoded at the receiver side RX and evaluated by a correction unit CU at the receiver side.

A calibration message contains a plurality of time slots in which orthogonal, preferably Walsh-encoded symbols are written. Preferably, in this case, a symbol is entered in a plurality of successive time slots. For statistical purposes, this is followed by an improvement of the evaluation at the receiver side.

To evaluate an alternating current characteristic, which is explained later with reference to FIG. 4A, it is advantageous to keep both the length of the symbols and the number of successive time slots in which the symbol is entered short so that the D.C. characteristic of the respective radiation source Ti, Tj, Tk is not reflected in the evaluated calibration messages.

On the other hand, a plurality of identical symbols transmitted in successive time slots can result in an advantageous evaluation of the DC behavior, as will be explained later with reference to FIG. 4B. Overall, however, the calibration messages should not exceed a temporal length of 10 milliseconds, since otherwise the human eye would perceive a flickering of the radiation sources Ti, Tj, Tk also used as interior lighting.

In the correction unit CU of the receiver TX, a compensation factor is now determined by means of comparing at least one channel property of at least one received calibration message with a corresponding channel property of at least one previously transmitted or stored calibration message.

To this end, the channel property matrix H, which, as described above, describes a plurality of channel properties, is stored by the correction unit CU on the receiver side RX as a reference channel matrix $H_0$ or is already present at the receiver side TX. After a plurality i of calibration message cycles, on the i-th calibration, newly assessed values for $H_1$ are compared with the old values for the reference channel property matrix $H_0$. Multiplying the inverted channel property matrix with the reference channel property matrix results in a matrix C wherein $C = H_i^{-1} H_0$.

If the difference exceeds a prespecified value, a number vector $c = \text{diag}(H_i^{-1} H_0)$ is transmitted back to the transmitter. In this case, the arithmetic operator diag $(\cdot)$ designates a column vector comprising the diagonal elements of a matrix $(\cdot)$. Therefore, in the present exemplary embodiment, the number vector c combines three compensation factors for the three elementary colors.

One possible criterion for initiating this process is to compare the values of c with the unit vector. If the relative differences between at least one of the vectorial elements of c are greater than the limits of a presettable confidence interval by the value of one, for example $1 \pm 0.05$, compensation is effected in the transmitter. A value of this kind can, for example, be determined with reference to a determination of a histogram of c and a predefined, adjustable and/or previously determined confidence interval. If the comparison of the values of the number vector of c with the unit vector results in a difference, which is, for example, higher than the upper limit of the confidence interval, said process is initiated.

For example, based on the determined vectorial compensation factor c, compensation information (not shown) is transmitted from the correction unit CU of the receiver RX to the transmitter TX.

If the secondary diagonal elements of the matrix $C = (H_i^{-1} H_0)$ are not equal to zero, this could be attributed to other sources of malfunctions, for example a blockage in the "crosstalk" of Ti and Tj to Rk. In this case, it is provided in one embodiment, that an error message is transmitted to the transmitter TX instead of the compensation information or additionally to the compensation information. At the transmitter side TX, a corresponding warning about a possible malfunction can then be issued to an identifiable receiver RX or to higher communication layers.

In the receiver, the digital signals to be transmitted are now multiplied with the associated values of c by interposing a respective correction element Ci, Cj, Ck so that the mixed color of the emitted light with conforms to the original.

The reference matrix $H_0$ originally stored on the receiver side in the correction unit CU on the receiver side TX can now be used again on the receiver side as a "decoding matrix".

A key idea of the present disclosure is hence based on the fact that a comparison of the compensation matrix $H_i$ with the original compensation matrix $H_0$ and the transfer of compensation factors c back to the transmitter enable a color drift of the transmitter to be compensated.

This enables a CSK-modulated optical free-space transmission system to be used simultaneously for lighting and/or signaling purposes.

According to one embodiment, a differentiation is made between a change of H by a movement of the transmitter and of the receiver toward each other on the one hand and a color displacement on the other in that, in the first case of a relative movement between the transmitter and receiver, a relative change of the values of c is of an equal size, but this is not so in the case of a color displacement according to the aforementioned second case.

In the case of a relative movement between the transmitter and the receiver, no correction value is sent from the receiver to the transmitter. However, $H_0$ is replaced by $H_i$.

In a further embodiment, the upper values of $|s_{Tx}|$ corrected in this way are limited in order to prevent overloading of the LED. Here, in accordance with the general notation $|\cdot|$ is the vector of the absolute values of $s_{Tx}$. These limit values can, for example, be prespecified by the manufacturer or also calculated from the recommended LED driver currents, if the matrix A is known.

It is important to note that the proposed method also functions in the case of strictly monotonous non-linearities between the drive current of the LED and the emitted optical power. If it is assumed there is only a simple linear relationship around a working point, the above-described compensation is preferably performed several times in sequence until a stable value for c is obtained.

If the color focus of the CCM diagram is deliberately displaced, a new $H_0$ has to be determined. If the color focus is unchanged, the above-described compensation method can be used again.

If the spectrum of the system transmission function is not "flat", the above-described formalized theory can be changed in the following way:

All the symbols in the above equations are replaced by the Fourier transform of the impulse responses, for example.

$$s_{Rx} \rightarrow F[s_{Rx}(t)] \quad (3)$$

wherein $F[\cdot]$ is a Fourier transform of $[\cdot]$ and t is a time variable. The equation (3) is then evaluated for the frequency for which a convex function of the vector $F[s_{Rx}(t)]$ assumes a maximum. This function is then used to calculate the frequency representation of H, which is designated $H_F$.

An example of a convex function of this kind is $$F[s_{R,Rx}(t)]^2 + F[s_{G,Rx}(t)]^2 + F[s_{B,Rx}(t)]^2 \quad (4)$$

Now, $H_F$ is used instead of H for the above-described determination of c.

Reference is also made to the fact that the above-described compensation method can also be used if no useful data are transmitted. To this end, it is only necessary to send calibration symbols at certain intervals and estimate the matrix H.

Figure 3:
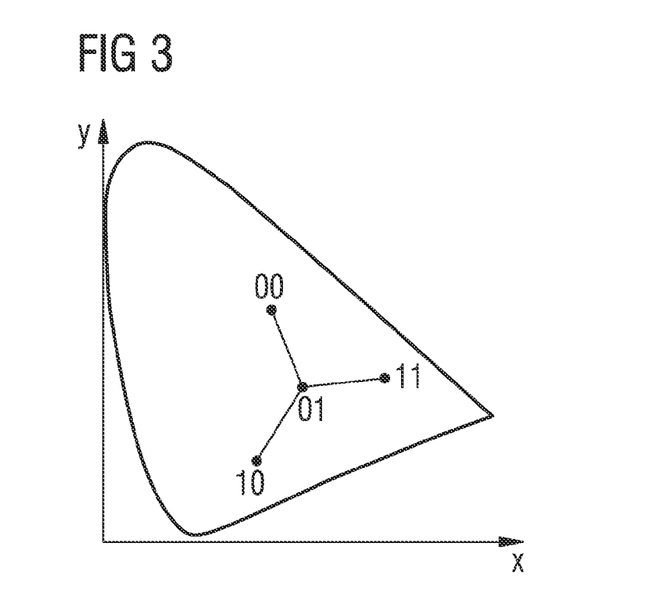
FIG. 3 shows a two-dimensional CIE standard color chart with a color assignment defined by four points.

FIG. 3 is two-dimensional standard color chart according to the definition of the Internal Commission of Illumination CIE. In this case, the three elementary colors, for example red, green, blue, are depicted on two coordinates x, y. A third elementary color is calculated for every point of the color chart from the other two by the relationship x+y+z=1.

The standard color chart according to FIG. 3 is a color assignment or color mapping for a 4-point CSK method, also called 4CSK. In this case, four color points are defined, these are designated 00, 01, 10, 11 in FIG. 3. A corresponding 4CSK transmission system is able to transmit 2 bits of data for each symbol 2.

Alternatively, any binary color assignments are possible. For a more detailed representation of practical embodiments, reference is made to the proposed modification to Standard IEEE P802.15, Yokoi et al.: "Modified Text clause 6.9.2.2", 17 Jan. 2010, Document Identification "15-10-0036-00-0007".

In other words, therefore, FIG. 3 is a graphical representation of a conversion (mapping) of a two-dimensional xy-value into a three-dimensional piece of intensity data by means of the transformer shown in FIG. 1.

Figure 4A:
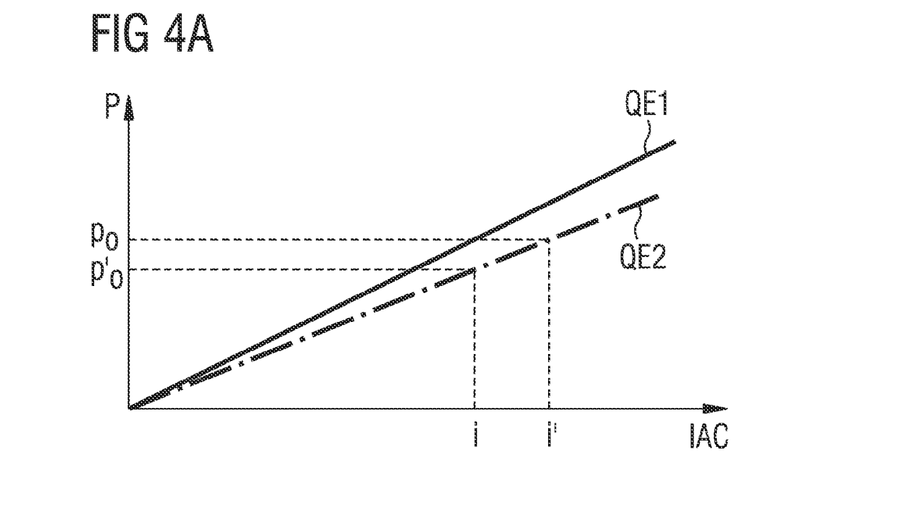
FIG. 4A shows a function of an optical radiant power of a radiation source in relation to a supplied driver alternating current.

FIG. 4A shows a function of the optical radiant power P of a radiation source Ti, Tj, Tk in dependence on a supplied driver alternating current IAC, which is also called quantum efficiency. It is assumed that this function is quasi-linear.

In this case, the continuous line shown in FIG. 4A corresponds to an original quantum efficiency QE1, which changes during the course of the operation of the radiation source, here, for example, it is reduced and represented by the dot-and-dash line underneath according to a changed quantum efficiency QE2.

The consequence of this changed quantum efficiency QE2 is that, for a given driver alternating current i, the original optical power $p_0$ drops to a lower value $p_0'$. To return to the original optical power $p_0$, the driver alternating current has to be changed to a higher value i'.

With respect to the quantum efficiency matrix Q, its diagonal elements are proportional to the quantum efficiency of a respective radiation source Ti, Tj, Tk.

Hence, a change in the quantum efficiency of individual radiation sources Ti, Tj, Tk results in a change in the quantum efficiency matrix Q to a changed quantum efficiency matrix Q' and accordingly to a changed channel property matrix H'.

Figure 4B:
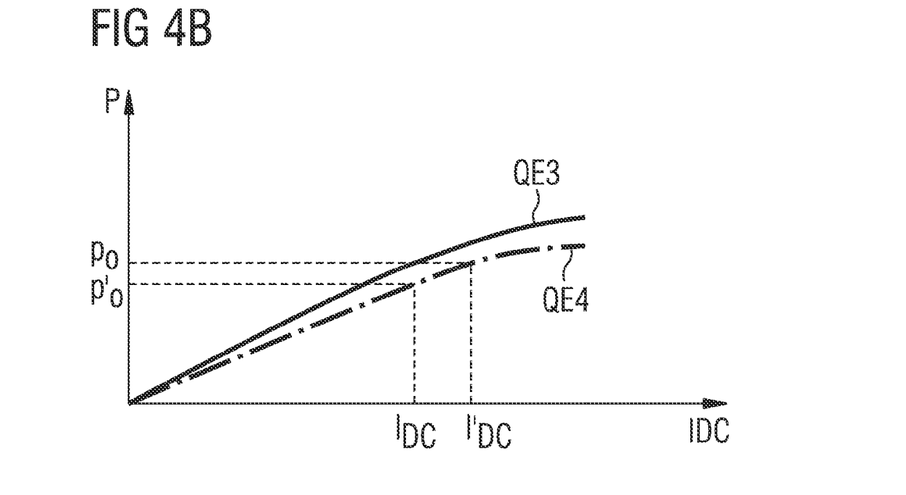
FIG. 4B shows a function of an optical radiant power of a radiation source in relation to a supplied driver direct current.

FIG. 4B shows a function of optical radiant power P of a radiation source Ti, Tj, Tk in dependence on a supplied driver direct current IDC. In practical embodiments, the light-emitting diodes used for the radiation sources have a quantum efficiency for direct currents deviating from the quantum efficiency for alternating currents according to 4A. The reasons for this are, for example, thermal inertia and possible saturation effects in the light-emitting diode.

As already mentioned, orthogonal codes, in particular modified Walsh-Codes can be used for the determination of the channel property matrix H with respect to the alternating current behavior.

A similar approach can be used for an assessment of the correction factors for the direct currents or working currents (bias current) of the light-emitting diode. To this end, the time slots of the orthogonal code are used, for example four Walsh code slots are repeatedly transmitted over the optical radiation source until this has assumed a thermal equilibrium. Therefore, for the determination of the channel property matrix with respect to the D.C. behavior, a plurality of time slots of the calibration message each receive an identical symbol.

The last received values at the end of a Walsh code slot are then used for the assessment of a D.C. channel property matrix $H_{DC}$. The respective channel property matrices are then used in a similar way to determine the correction value $c_{DC} = \mathrm{diag}(H_{DCi}^{-1} H_{DC0})$.

To this end, for a non-linear characteristic D.C. curve according to FIG. 4b, more than one iteration step may be necessary in order to arrive at a focus or working point within the CSK diagram according to FIG. 3. In the present exemplary embodiment, the focus in FIG. 3 is designated with reference number 01. The other points shown 00, 01, 10, 11 correspond to constellation points of the constellation diagram. In other embodiments, the focus can also lie next to the constellation points of the constellation diagram.

This iteration only converges only in cases in which the characteristic D.C. curve has a strictly monotonous course.

What is claimed is:

1. A method for optically transferring data between a transmitter and a receiver, comprising:
   providing a color coding method based on a plurality of elementary colors for encoding and transferring the data,
   transmitting each elementary color by at least one respective optical radiation source on the transmitter side and receiving each elementary color on the receiver side by at least one respective optical radiation receiver, forming a control loop between the transmitter and the receiver, transmitting calibration messages from the transmitter to the receiver, determining by the receiver a compensation factor comprising or based on a number vector including diagonal elements of a compensation matrix determined from a channel property matrix of at least one received calibration message and a corresponding channel property matrix of at least one previously received or stored calibration message, based on the determined compensation factor, the receiver transmitting compensation information to the transmitter, and adjusting at least one transmitting parameter in the transmitter based on the determined compensation information.

2. The method of claim 1, wherein a compensation factor is determined for each elementary color.

3. The method of claim 1, comprising a transformer on the transmitter side converting two-dimensional digital intensity data into an intensity data vector with a dimension corresponding to the plurality of elementary colors.

4. The method of claim 1, wherein three elementary colors are used.

5. The method of claim 1, wherein at least one compensation factor is determined by comparing the channel property matrix with the reference channel property matrix.

6. The method of claim 5, comprising checking at least one secondary diagonal element of the compensation matrix to determine whether the at least one secondary diagonal element deviates substantially from a value of zero.

7. The method of claim 6, comprising transmitting an error message in the case of a substantial deviation of at least one secondary diagonal element of the compensation matrix.

8. The method of claim 1, wherein the compensation matrix is obtained by multiplying the inverted channel property matrix with the reference channel property matrix.

9. The method of claim 8, wherein the receiver transmits compensation information to the transmitter only when at least one vectorial element of the determined compensation factor has a value substantially unequal to one.

10. The method of claim 9, wherein at least one vectorial element of the compensation factor has a value substantially unequal to one when the value of the vectorial element exceeds and/or falls below a presettable confidence interval by a value of one.

11. The method of claim 1, wherein the calibration message comprises orthogonal calibration symbols.

12. The method of claim 11, wherein to determine the channel property matrix with respect to the D.C. behavior, a plurality of time slots of calibration message each contain an identical calibration symbol.

13. The method of claim 1, wherein the calibration message comprises Walsh-encoded calibration symbols.

14. A method for optically transferring data between a transmitter and a receiver, comprising:

providing a color coding method based on a plurality of elementary colors for encoding and transferring the data, transmitting each elementary color by at least one respective optical radiation source on the transmitter side and receiving each elementary color on the receiver side by at least one respective optical radiation receiver, forming a control loop between the transmitter and the receiver, transmitting calibration messages from the transmitter to the receiver, determining a compensation factor comprising or based on a number vector including diagonal elements of a compensation matrix determined from a channel property matrix of at least one received calibration message and a corresponding reference channel property matrix of at least one previously received or stored calibration message, and adjusting at least one transmitting parameter in the transmitter based on the determined compensation factor.

15. A transmitter of an optical transmission system for optically transferring data to a receiver using a color coding method based on a plurality of elementary colors, the transmitter comprising:

a plurality of optical radiation sources, each configured to transmit a respective elementary color to the receiver, control electronics configured to control the optical radiation sources to:

transmit data to the receiver, and transmit calibration messages to the receiver, a receiver interface configured to receive from the receiver compensation information comprising or based on a number vector including diagonal elements of a compensation matrix determined from a channel property matrix of at least one received calibration message from the transmitter and a corresponding channel property matrix of at least one previously received or stored calibration message from the transmitter; and a correction element configured to adjust at least one transmitting parameter of at least one of the optical radiation sources based on the compensation information received from the receiver.

16. A receiver for use in an optical transmission system in which a transmitter optically transfers data to the receiver using a color coding method based on a plurality of elementary colors, the receiver comprising:

one or more radiation receiving elements configured to receive radiation from the transmitter in the plurality of elementary colors, the received radiation including:

transmitted data, and calibration messages, a compensation unit configured to determine a compensation factor comprising or based on a number vector including diagonal elements of a compensation matrix determined from a channel property matrix of at least one received calibration message from the transmitter and a corresponding channel property matrix of at least one previously received or stored calibration message from the transmitter, and a transmitter interface configured to transmit compensation information based on the determined compensation factor to the transmitter.

17. The receiver of claim 16, wherein the compensation unit is configured to determine the compensation matrix factor by comparing a channel property matrix of at least one received calibration message with a corresponding reference channel property matrix of at least one previously received or stored calibration message from the transmitter.

18. An optical transmission system for optically transferring data using a color coding method based on a plurality of elementary colors, the optical transmission system comprising:

a transmitter comprising a plurality of a plurality of optical radiation sources, each configured to transmit a respective elementary color; and
a receiver comprising one or more radiation receiving elements configured to receive the radiation from the transmitter in the plurality of elementary colors,
the transmitter configured to control the optical radiation sources to:
  transmit data to the receiver, and
  transmit calibration messages to the receiver,
the receiver further comprising:
  a compensation unit configured to determine a compensation factor comprising or based on a number vector including diagonal elements of compensation matrix determined from a channel property matrix of at least one received calibration message from the transmitter and a corresponding channel property matrix of at least one previously received or stored calibration message from the transmitter, and
  a transmitter interface configured to transmit compensation information based on the determined compensation factor to the transmitter,
the transmitter further comprising:
  a receiver interface configured to receive compensation information from the receiver; and
  a correction element configured to adjust at least one transmitting parameter of at least one of the optical radiation sources based on the compensation information received from the receiver.

* * * * *